Jan. 14, 1958   P. J. RIEPPEL ET AL   2,819,884
PRESSURE-WELDED TUBING
Filed Aug. 25, 1954
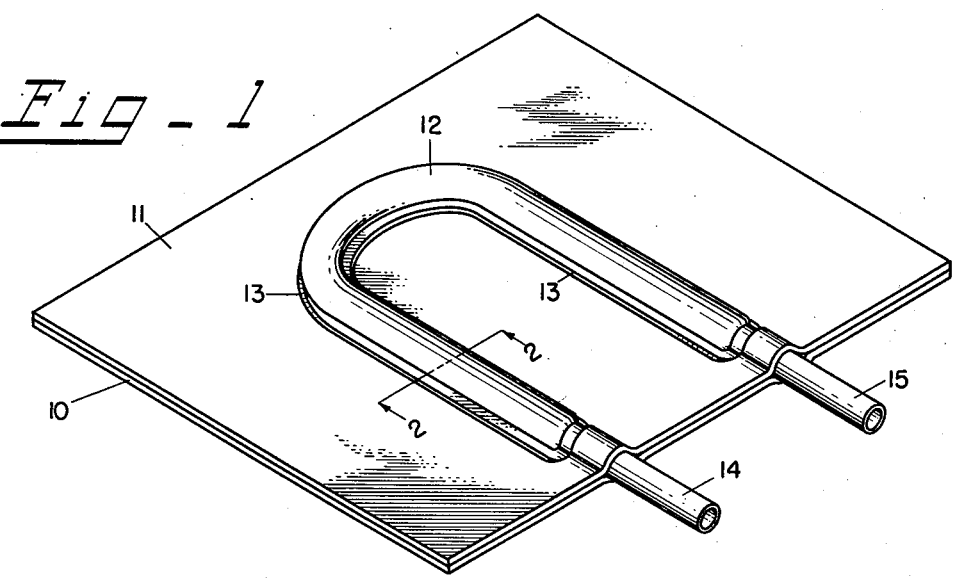
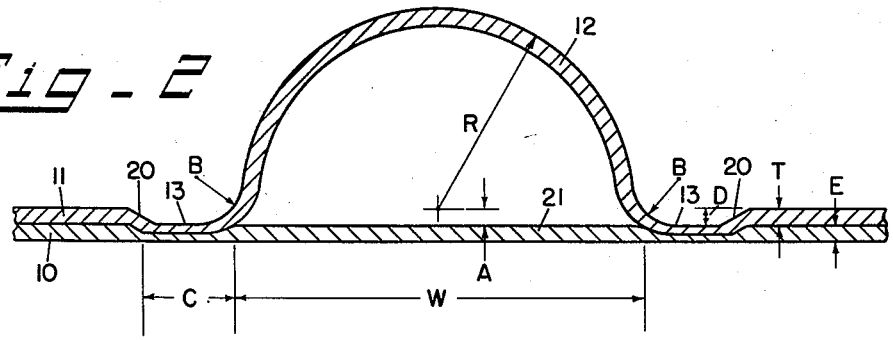
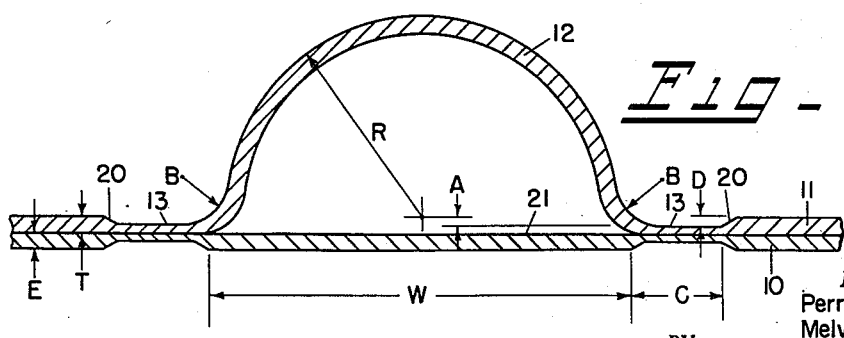
INVENTOR.
Perry J. Rieppel
Melvin C. Clapp
Edwin G. Elliott, Jr.
BY
ATTORNEYS.

United States Patent Office 2,819,884
Patented Jan. 14, 1958

2,819,884

PRESSURE-WELDED TUBING

Perry J. Rieppel, Worthington, and Melvin C. Clapp and Edwin G. Elliott, Jr., Columbus, Ohio, assignors, by mesne assignments, to The Metal Specialty Company, Cincinnati, Ohio, a corporation of Ohio Application August 25, 1954, Serial No. 452,084

4 Claims. (Cl. 257—256)

This invention relates to pressure welding, and more in particular, to an improved heat-exchange unit of aluminum or aluminum alloys formed by a pressure-welding method.

Pressure welding of sheets of aluminum or similar materials to form heat-exchange units is a well-known art. This process consists primarily in inserting the materials to be welded together between a pair of dies and then closing the dies until a predetermined deformation has occurred in the metal sheets. The welding may be done either with or without the application of heat to the material being welded. When heat is applied to the process, however, the necessary deformation to obtain a good weld is somewhat reduced, and the necessary pressure applied to the dies is much less in the case where heat is applied to the sheets to be welded. In the forming of heat exchangers by this process, either one or both of these sheets is formed so that a continuous tubing appears between the sheets when they are welded together. In order for the tubing to withstand the pressures usual in heat-exchanging systems, the sheets are usually welded together by a continuous pressure welding seam at the periphery of the tubing. The tubing in the sheets may be formed either by stamping or similar processes prior to the welding operation or the forming may be done simultaneously with the pressure welding by using formed dies and injecting a gas pressure between the sheets when the sheets are being welded together. Such methods are disclosed in the copending application of Perry J. Rieppel, Melvin C. Clapp, and Edwin G. Elliott, Jr., filed March 10, 1954, Serial No. 415,272 and in the article "Manufacturing of Light Alloy Charge-Cooler Element" by H. Herrmann, Metal Industry, February 22, 1946, pages 143 to 147.

It is well known that heat-exchange units may also be made by other methods, such as by spot welding preformed sheets together. In these methods, the sheets are generally made of steel. Although advantages may be derived from the greater strength inherent in steel sheets, they do not have as desirable heat transfer characteristics as aluminum or aluminium alloys, which are not readily spot welded. It is also more difficult to form steel sheets.

In the formation of the tubing in pressure welded aluminum heat exchangers, extreme difficulty has been encountered in the formation of units capable of withstanding the pressures normally encountered in heat-exchanging systems without increasing the thickness of the metals to such an extent that pressure welding the sheets is impractical. It has been found that the shape of the cross section of the tubing used in these heat exchangers as well as the depth and orientation of the adjacent pressure welds with respect to the tubing, are very critical in order to produce a heat-exchange unit having the necessary capacities for use in present-day systems.

It is therefore an object of this invention to provide an improved heat-exchange unit of metal sheet having formed tubing in the sheets adjacent to continuous pressure welds.

It is also an object to provide an improved heat-exchange unit fabricated from sheets of aluminum or aluminum alloys having formed tubing adjacent to pressure welds capable of withstanding pressures normally encountered in heat-exchange systems.

Other objects and advantages of this invention will become obvious from the following specification, the appended claims, and the included drawings.

In the drawings:

Fig. 1 is a perspective view of a typical heat-exchange unit embodying the principles of this invention;

Fig. 2 is an enlarged cross-sectional view on the plane 2—2 of a heat-exchange unit of Fig. 1 illustrating the shape of the tubing; and Fig. 3 is an enlarged cross-sectional view on the plane 2—2 of the heat-exchange unit of Fig. 1 and illustration of an alternative arrangement of welding teeth.

Referring now to Fig. 1, a typical heat-exchange unit embodying the principles of this invention comprises a bottom sheet 10 and a top sheet 11. These sheets are pressure-weldable aluminum or alloys of aluminum. A continuous tube 12 is formed in one of the sheets. This tube may be formed either before the welding operation or simultaneously therewith. The sheets are joined together by a continuous pressure weld 13 surrounding the tube, and outlets 14 and 15 are provided, communicating with the tube 12. Referring now to Fig. 2, it is seen that the tube or convolution formed in upper sheet 12 has a radius R and the center of curvature of the tube is elevated a short distance A above the unformed bottom 21 of the convolution. The edges of the convolution are provided with a radius B joining smoothly with the bottom of pressure weld 13. The over-all width W of the convolution extends between the points where the radii B contact the bottom of the pressure welds 13. The pressure welds 13 have a width C extending outwardly from the edges of the convolution. It is preferred that the outer edges 20 of the pressure weld 13 be formed at about a 45° angle to the surface of the sheets. For good welds on aluminum or aluminum alloys, it has been found that the depth D of the pressure weld should be at least 50 percent of the sum of thickness T of the upper sheet and thickness E of the lower sheet when the pressure welding is performed at an elevated temperature from about 750° F. to 850° F.

It has now been found that the particular dimensions of the cross section of the convolution are extremely important in making a heat exchanger having a strength and capacity as high as possible, using a minimum of material. When sheet aluminum having a thickness of from 0.025 to 0.06 inch is used to form the exchanger, it has been found that the width W of the convolution may be up to 0.8 inch, the greater thickness permitting the use of a wider convolution, and the optimum outside radius R of the convolution is about one third of the width. The transition radii B must be as least about ⅛ inch. The width C of the weld is not as critical, but it has been found that a satisfactory joint is produced when the width is about one half of the height of the convolution (the radius R plus or minus the displacement A). As an example, the optimum width W of the convolution using 40 mil aluminum is about 0.6 inch. Under these conditions, the optimum radius R of the convolution is about 3/16 inch and displacement A of the center of curvature may be up to 0.05 inch from the bottom 21 of the convolution when the deformation D is substantially 50 percent, and the transition radii B should be about ⅛ inch. The width C of the pressure weld should be about 0.120 inch. In this example when the convolution is wider than about 0.6 inch, the bottom sheet tends to bulge under normally encountered heat-exchanger system pressures, and when the width is decreased, the convolution does not have the desired cross-sectional area. When the radius R of the convolution is increased without increasing the width, difficulties arise in the fabrication of the convolution by a pressure-forming process because of too great stressing of the metal, and the convolution tends to have weak spots. When the radius R is decreased, the cross-sectional area of the convolution is, of course, also decreased. Similarly, increasing the transition radii B also decreases the cross-sectional area. When these radii are less than about ⅛ inch, the metal cannot be formed around these edges by the pressure-forming process without materially decreasing the strength or causing the metal to split. The displacement A is introduced in order to increase the cross-sectional area without affecting the bulge strength of the unit. It has been found that when the convolutions are formed by pressure forming, the sides of the convolutions must not, at any point, be perpendicular to the plane of the sheets 10 and 11. In other words, when the sides of the convolutions do not have a definite slope (i. e. form an acute angle with the plane of the bottom 21), the convolution cannot be pressure formed due to excess stretching of the metal at the transition radii. Thus, the displacement A must not be great enough to cause the sides of the convolution to be perpendicular to the plane of the sheets.

In the alternative shape of the convolution illustrated in Figure 3, pressure welding deforms the bottom sheet 10 as well as the top sheet 11. In this case, the only dimension that is affected is the displacement A, and this dimension should now be from about 0.06 to 0.07 inch when the welding deformation is about 50%.

In both Figures 2 and 3, the displacement distance A may better be measured from the bottom 13 of the pressure weld, and in each case the dimension would be about 0.04 to 0.05 inch.

It will be understood, of course, that while the forms of the invention herein shown and described, constitute perferred embodiments of the invention, it is not intended herein to illustrate all of the possible equivalent forms or ramifications of the invention. Thus, while the invention has been particularly described with reference to a heat-exchange unit formed from sheets of alumiumn, it is contemplated that various aluminum alloys may also be used, if these alloys are readily adaptable to pressure welding. It will also be understood that the words used are words of description rather than of limitation and that various changes may be substituted without departing from the spirit or scope of the invention herein disclosed.

What is claimed is:

1. In a heat-exchange unit formed from a pair of sheets of aluminum or a pressure-weldable aluminum alloy substantially 0.04 inch in thickness, a tubing formed in one of said sheets and having an outside cross-sectional radius of about 3/16 inch, transitional cross-sectional radii of about ⅛ inch, a total over-all width of about 0.6 inch, and a continuous pressure weld adjacent said tubing, welding said sheets together.

2. In a heat-exchange unit formed from a pair of sheets of aluminum or a pressure-weldable aluminum alloy substantially 0.04 inch in thickness, a tubing formed in one of said sheets and having an outside cross-sectional radius of about 3/16 inch, transitional cross-sectional radii of about ⅛ inch, and a continuous pressure weld adjacent said tubing, welding said sheets together, the center of curvature of said radius being displaced between about 0.04 to 0.05 inch above the bottom of said weld.

3. In a heat-exchange unit formed from a pair of sheets of aluminum or a pressure-weldable aluminum alloy substantially 0.04 inch in thickness, a pressure-formed tubing formed in one of said sheets and having an outside cross-sectional radius of about 3/16 inch, transitional cross-sectional radii of about ⅛ inch, a total over-all width of about 0.6 inch, and a continuous pressure weld adjacent said tubing, welding said sheets together, the center of curvature of said radius being displaced between about 0.04 to 0.05 inch above the bottom of said weld.

4. In a heat-exchange unit formed from a pair of sheets of aluminum or a pressure-weldable aluminum alloy substantially 0.04 inch in thickness, a pressure-formed tubing formed in one of said sheets and having an outside cross-sectional radius of about 3/16 inch, transitional cross-sectional radii of about ⅛ inch, a total over-all width of about 0.6 inch, and a continuous pressure weld adjacent said tubing, welding said sheets together, the center of curvature of said radius being displaced between about 0.04 to 0.05 inch above the bottom of said weld, the sides of said tubing always forming an acute angle with the plane of said bottom.

References Cited in the file of this patent

UNITED STATES PATENTS

| | | |
|---|---|---|
| 2,271,437 | Lewis | Jan. 27, 1942 |
| 2,306,772 | Benson | Dec. 29, 1942 |
| 2,522,408 | Sowter | Sept. 12, 1950 |